US008396967B2

(12) United States Patent
Nakai

(10) Patent No.: US 8,396,967 B2
(45) Date of Patent: Mar. 12, 2013

(54) INFORMATION PROCESS SYSTEM, INFORMATION PROCESS APPARATUS, CONTROL METHOD THEREFOR, AND STORAGE MEDIUM

(75) Inventor: Hironobu Nakai, Komae (JP)

(73) Assignee: Canon Kabushiki Kaisha (JP)

( * ) Notice: Subject to any disclaimer, the term of this patent is extended or adjusted under 35 U.S.C. 154(b) by 154 days.

(21) Appl. No.: 12/609,777

(22) Filed: Oct. 30, 2009

(65) Prior Publication Data

US 2010/0115148 A1  May 6, 2010

(30) Foreign Application Priority Data

Oct. 31, 2008 (JP) ................................ 2008-282437

(51) Int. Cl.
*G06F 3/00* (2006.01)
(52) U.S. Cl. ........................................ 709/226; 370/447
(58) Field of Classification Search .................. 709/226; 370/447
See application file for complete search history.

(56) References Cited

U.S. PATENT DOCUMENTS

| 6,609,162 | B1 | 8/2003 | Shimizu et al. |
| 6,763,150 | B1 * | 7/2004 | MacDonald .................. 382/304 |
| 2003/0078823 | A1 * | 4/2003 | Yoshioka et al. ................. 705/8 |
| 2006/0129441 | A1 * | 6/2006 | Yankovich et al. .............. 705/8 |
| 2006/0161495 | A1 * | 7/2006 | Wigzell ........................... 705/37 |
| 2006/0203849 | A1 * | 9/2006 | Bonar et al. ................... 370/473 |
| 2006/0238786 | A1 * | 10/2006 | Sakura et al. .................. 358/1.9 |
| 2007/0014613 | A1 * | 1/2007 | Ohashi ............................ 400/62 |
| 2007/0133047 | A1 * | 6/2007 | Matsueda .................... 358/1.15 |
| 2007/0189322 | A1 * | 8/2007 | Hirose .......................... 370/447 |
| 2008/0129879 | A1 * | 6/2008 | Shao et al. .................... 348/723 |
| 2008/0133030 | A1 * | 6/2008 | Torigoe ............................ 700/2 |

FOREIGN PATENT DOCUMENTS

| JP | 2000-187573 A | 7/2000 |
| JP | 2007-328651 A | 12/2007 |

OTHER PUBLICATIONS

Office Action Issued in Corresponding Japanese Patent Application 2008-282437 dated Oct. 29, 2012.

* cited by examiner

*Primary Examiner* — Tesfay Yohannes
(74) *Attorney, Agent, or Firm* — Rossi, Kimms & McDowell LLP

(57) ABSTRACT

An information processing system is disclosed that makes it possible to easily create a process definition ticket according to a template created by checking common capabilities of devices. Devices on a network that have a potential for being used to execute a process based on the process definition ticket are selected, and information on capabilities of the selected devices is obtained. Functions common or uncommon to the devices are displayed in an identifiable manner based on the information on the capabilities of the devices. A process definition ticket template including common capabilities of the selected devices is generated with respect to process items in the template that are designated. A process definition ticket that is to be executed using the devices is created based on the generated template.

8 Claims, 13 Drawing Sheets

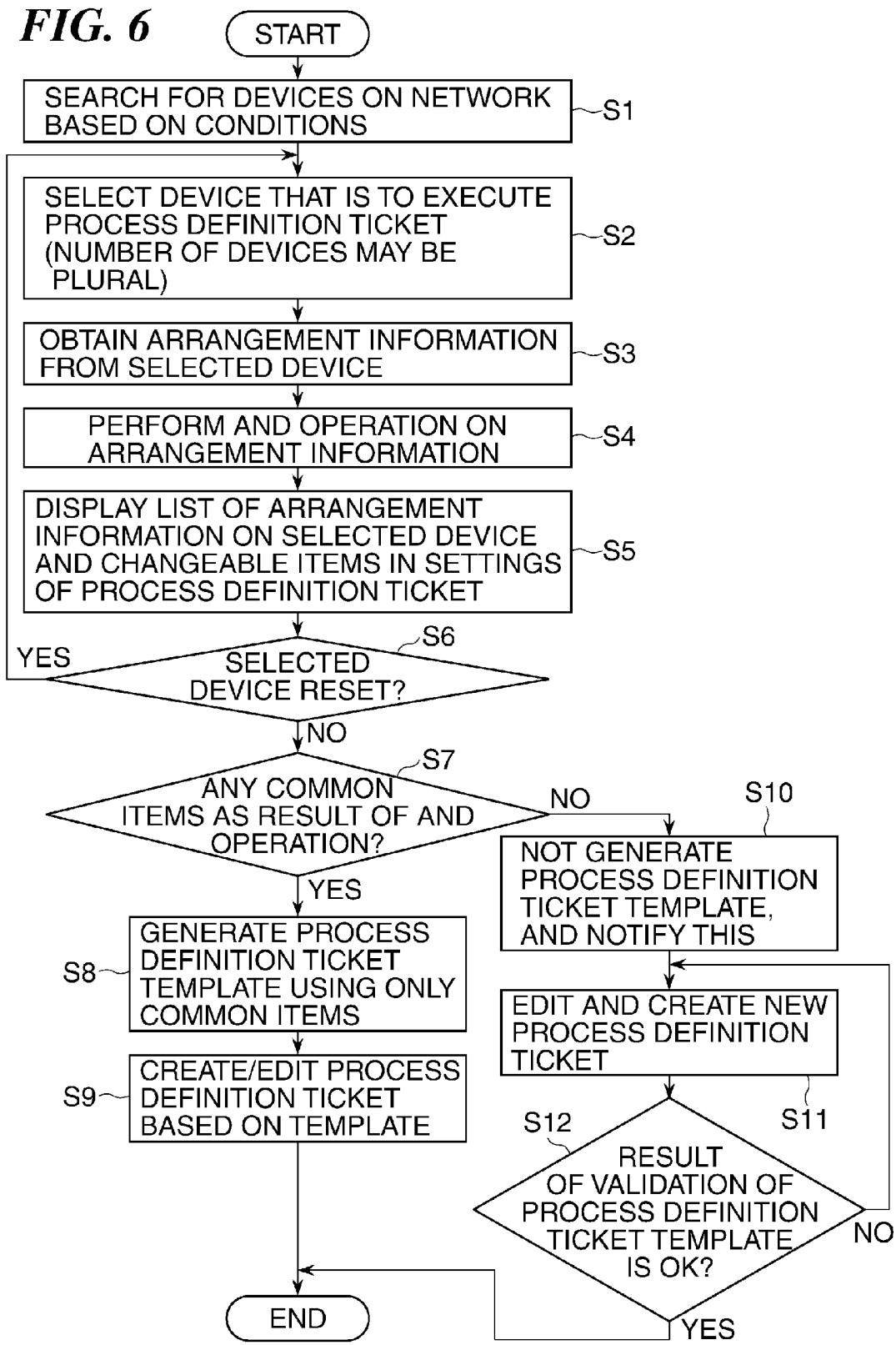

FIG. 7

| | | 712 | 713 | 714 | 715 | 716 |
|---|---|---|---|---|---|---|
| | SETTING ITEM | | FILTER | DEVICE 105 | DEVICE 106 | DEVICE 107 |
| 701 | IMAGE FORMAT | | | JPEG | JPEG | JPEG |
| | | | | RAW | RAW | RAW |
| | | | | TIFF | TIFF | TIFF |
| | | | | BMP | BMP | BMP |
| 702 | DETECTION OF ORIGINAL SIZE | | | YES | YES | NO |
| 703 | READING RESOLUTION | X-DIRECTION | | 100 | 100 | — |
| | | | | 200 | 200 | — |
| | | | | 300 | 300 | — |
| | | | | 400 | 400 | — |
| | | | | 600 | 600 | 600 |
| | | | | 1200 | 1200 | 1200 |
| | | | | — | — | 2400 |
| | | Y-DIRECTION | | 100 | 100 | — |
| | | | | 200 | 200 | — |
| | | | | 300 | 300 | — |
| | | | | 400 | 400 | — |
| | | | | 600 | 600 | 600 |
| | | | | 1200 | 1200 | 1200 |
| | | | | — | — | 2400 |
| 704 | COLOR READING | | | BLACK AND WHITE | BLACK AND WHITE | BLACK AND WHITE |
| | | | | RGB24 | RGB24 | — |
| 705 | ZOOM | | | YES | YES | YES |
| 706 | READING SIZE(mm) | X-MINIMUM | | 140 | 140 | 100 |
| | | X-MAXIMUM | | 297 | 297 | 297 |
| | | Y-MINIMUM | | 140 | 140 | 140 |
| | | Y-MAXIMUM | | 630 | 210 | 210 |
| 707 | DOUBLE-SIDED READING | | | YES | NO | NO |
| 708 | IMAGE COMPRESSION | | | YES | YES | YES |
| 709 | PRESENCE OR ABSENCE OF ADF | | | YES | NO | YES |
| 710 | CONTRAST ADJUSTMENT | | | YES | YES | YES |
| 711 | LUMINANCE CHANGE | | | YES | YES | YES |

FIG. 8

| SETTING ITEM | | FILTER | DEVICE 105 | DEVICE 106 | DEVICE 107 | |
|---|---|---|---|---|---|---|
| IMAGE FORMAT | | ■ | JPEG | JPEG | JPEG | 801 |
| | | | RAW | RAW | RAW | |
| | | | TIFF | TIFF | TIFF | |
| | | | BMP | BMP | BMP | |
| DETECTION OF ORIGINAL SIZE | | | YES | YES | NO | |
| READING RESOLUTION | X-DIRECTION | | 100 | 100 | — | |
| | | | 200 | 200 | — | |
| | | | 300 | 300 | — | |
| | | | 400 | 400 | — | |
| | | ■ | 600 | 600 | 600 | 802 |
| | | | 1200 | 1200 | 1200 | |
| | | | — | — | 2400 | |
| | Y-DIRECTION | | 100 | 100 | — | |
| | | | 200 | 200 | — | |
| | | | 300 | 300 | — | |
| | | | 400 | 400 | — | |
| | | ■ | 600 | 600 | 600 | 803 |
| | | | 1200 | 1200 | 1200 | |
| | | | — | — | 2400 | |
| COLOR READING | | | BLACK AND WHITE | BLACK AND WHITE | BLACK AND WHITE | |
| | | ■ | RGB24 | RGB24 | — | 804 |
| ZOOM | | | YES | YES | YES | |
| READING SIZE(mm) | X-MINIMUM | | 140 | 140 | 100 | |
| | X-MAXIMUM | | 297 | 297 | 297 | |
| | Y-MINIMUM | | 140 | 140 | 140 | |
| | Y-MAXIMUM | | 630 | 210 | 210 | |
| DOUBLE-SIDED READING | | ■ | YES | NO | NO | 805 |
| IMAGE COMPRESSION | | | YES | YES | YES | |
| PRESENCE OR ABSENCE OF ADF | | ■ | YES | NO | YES | 806 |
| CONTRAST ADJUSTMENT | | | YES | YES | YES | |
| LUMINANCE CHANGE | | | YES | YES | YES | |

| SETTING ITEM | | FILTER | DEVICE 105 | DEVICE 106 | |
|---|---|---|---|---|---|
| IMAGE FORMAT | | ■ | JPEG | JPEG | ~ 1001 |
| | | | RAW | RAW | |
| | | | TIFF | TIFF | |
| | | | BMP | BMP | |
| DETECTION OF ORIGINAL SIZE | | | YES | YES | |
| READING RESOLUTION | X-DIRECTION | | 100 | 100 | |
| | | | 200 | 200 | |
| | | | 300 | 300 | |
| | | | 400 | 400 | |
| | | ■ | 600 | 600 | ~ 1002 |
| | | | 1200 | 1200 | |
| | Y-DIRECTION | | 100 | 100 | |
| | | | 200 | 200 | |
| | | | 300 | 300 | |
| | | | 400 | 400 | |
| | | ■ | 600 | 600 | ~ 1003 |
| | | | 1200 | 1200 | |
| COLOR READING | | | BLACK AND WHITE | BLACK AND WHITE | |
| | | ■ | RGB24 | RGB24 | ~ 1004 |
| ZOOM | | | YES | YES | |
| READING SIZE(mm) | X-MINIMUM | | 140 | 140 | |
| | X-MAXIMUM | | 297 | 297 | |
| | Y-MINIMUM | | 140 | 140 | |
| | Y-MAXIMUM | | 630 | 210 | |
| DOUBLE-SIDED READING | | | YES | NO | |
| IMAGE COMPRESSION | | | YES | YES | |
| PRESENCE OR ABSENCE OF ADF | | | YES | NO | |
| CONTRAST ADJUSTMENT | | | YES | YES | |
| LUMINANCE CHANGE | | | YES | YES | |

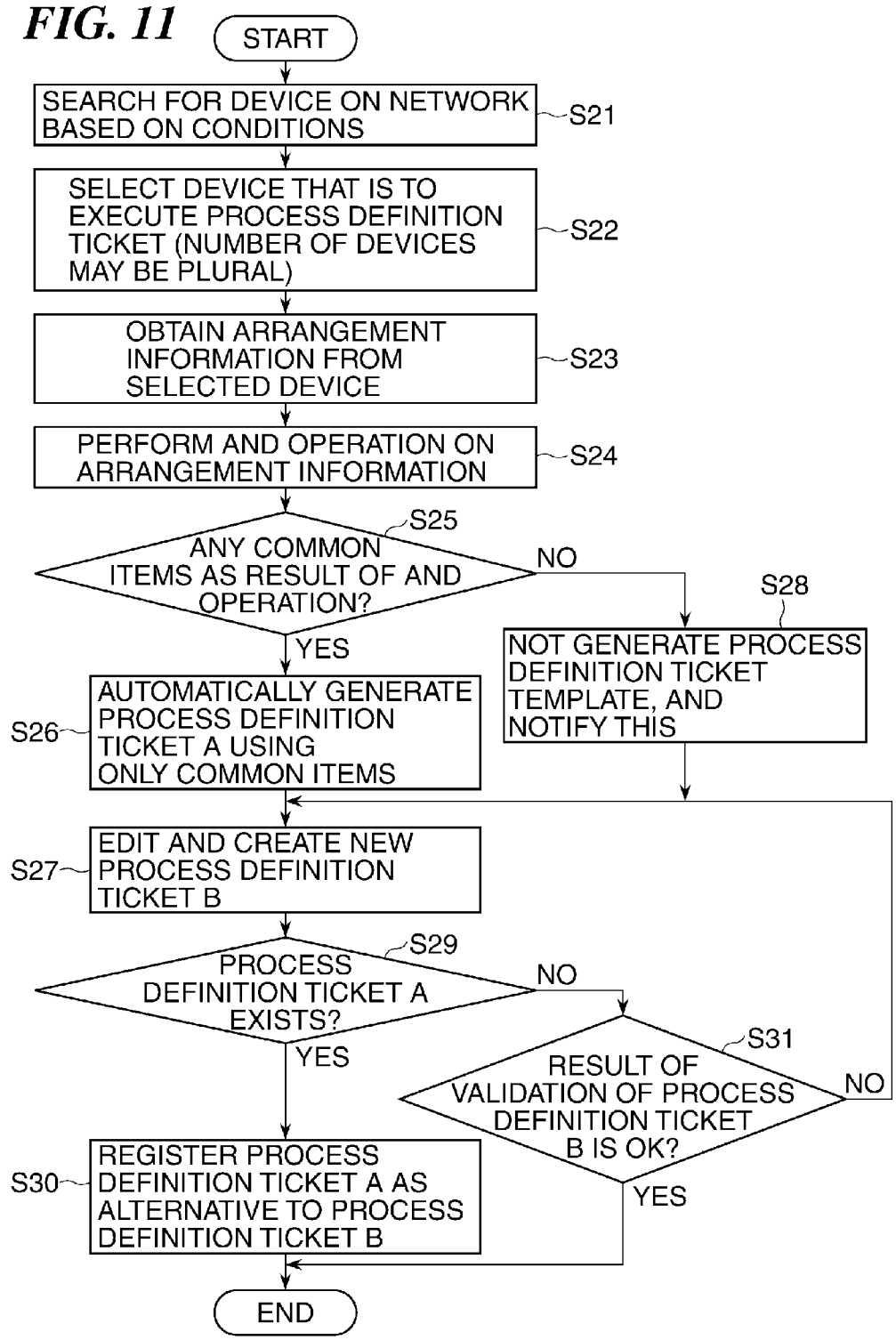

FIG. 13A

| PROCESS DEFINITION TICKET TO BE DISTRIBUTED (1310) | ALTERNATIVE PROCESS DEFINITION TICKET (1311) | EXPLANATION OF ALTERNATIVE PROCESS DEFINITION TICKET (1312) |
|---|---|---|
| PROCESS DEFINITION TICKET C (1313) | PROCESS DEFINITION TICKET D | PROCESS DEFINITION TICKET D: WHEN ADF BECOMES UNUSABLE (1315) |
| | PROCESS DEFINITION TICKET E | PROCESS DEFINITION TICKET E: WHEN COLOR SCANNING BECOMES IMPOSSIBLE (1316) |
| | PROCESS DEFINITION TICKET F | PROCESS DEFINITION TICKET F: WHEN DETECTION OF ORIGINAL SIZE BECOMES IMPOSSIBLE (1317) |
| PROCESS DEFINITION TICKET V (1314) | PROCESS DEFINITION TICKET W | PROCESS DEFINITION TICKET W: WHEN ADF BECOMES UNUSABLE (1318) |
| | PROCESS DEFINITION TICKET X | PROCESS DEFINITION TICKET X: WHEN COLOR SCANNING BECOMES IMPOSSIBLE (1319) |
| | PROCESS DEFINITION TICKET Y | PROCESS DEFINITION TICKET Y: WHEN DOUBLE-SIDED READING BECOMES IMPOSSIBLE (1320) |

| PROCESS DEFINITION TICKET TO BE DISTRIBUTED | ALTERNATIVE PROCESS DEFINITION TICKET | EXPLANATION OF ALTERNATIVE PROCESS DEFINITION TICKET |
|---|---|---|
| PROCESS DEFINITION TICKET D | PROCESS DEFINITION TICKET C | PROCESS DEFINITION TICKET C: PROCESS DEFINITION TICKET ON WHICH PROCESS DEFINITION TICKETS D, E, F ARE BASED |
| | PROCESS DEFINITION TICKET E | PROCESS DEFINITION TICKET E: WHEN COLOR SCANNING BECOMES IMPOSSIBLE |
| | PROCESS DEFINITION TICKET F | PROCESS DEFINITION TICKET F: WHEN DETECTION OF ORIGINAL SIZE BECOMES IMPOSSIBLE |
| PROCESS DEFINITION TICKET V | PROCESS DEFINITION TICKET W | PROCESS DEFINITION TICKET W: WHEN ADF BECOMES UNUSABLE |
| | PROCESS DEFINITION TICKET X | PROCESS DEFINITION TICKET X: WHEN COLOR SCANNING BECOMES IMPOSSIBLE |
| | PROCESS DEFINITION TICKET Y | PROCESS DEFINITION TICKET Y: WHEN DOUBLE-SIDED READING BECOMES IMPOSSIBLE |

INFORMATION PROCESS SYSTEM, INFORMATION PROCESS APPARATUS, CONTROL METHOD THEREFOR, AND STORAGE MEDIUM

BACKGROUND OF THE INVENTION

1. Field of the Invention

The present invention relates to an information process system that includes information process devices, an information process apparatus that creates or executes a process definition ticket defining a process comprised of a plurality of processes, a method of controlling the information process apparatus, and a storage medium that stores a program for implementing the method.

2. Description of the Related Art

There is an information process system in which a scanner, a facsimile machine, a printer, a copy machine, or a multifunctional peripheral acting as a combination of these machines, a personal computer, a mail server, and so on are connected together via a network, and a process is carried out using services offered by these machines in cooperation with each other. Also, a method of efficiently managing, operating, and using the information process system has been proposed. According to Japanese Laid-Open Patent Publication (Kokai) No. 2000-187573, in the case that a plurality of devices are used in combination, device information on both an input device and an output device are obtained and managed, and only functions executable by combinations of the input device and the output device are provided in advance as a multifunctional system to a user. Moreover, in the case that a combination of operations using a plurality of devices are set, only settings executable by the combination are validated in the devices, and it is thus unnecessary for a user to manage combinations of restrictive conditions of an input device and restrictive conditions of an output device, which is convenient.

According to the above described prior art, because only functions that can be realized by combinations of a plurality of devices are provided to a user, and function settings are restricted, user convenience is improved. However, there may be a case where when there are a plurality of devices having the same function (for example, a scanner function) on a network, the plurality of devices are selected as a combination of potential devices that realizes a certain function. In this case, it is impossible to ascertain in advance which device's capability restricts and narrows choices of executable functions.

Also, it is assumed that a certain process is created in advance, a file that defines the process is distributed to individual users, and part of the process (for example, scanning a document and storing the same as a file) is executed using a device such as an MFP. In this case, there arises the problem that a device assumed to be used in the process definition file cannot execute a function assigned thereto for some reason. The above described prior art cannot cope with such a problem. Moreover, the same problem arises when part of functions of a combination of devices operated by users becomes unusable for some reason such as a failure even if the combination of the devices presents no problem at the time of preliminary checking.

SUMMARY OF THE INVENTION

The present invention provides an information process system, an information process apparatus, a method of controlling the information process apparatus, and a storage medium that make it possible to more easily create a process definition ticket according to a template created by checking common capabilities of devices. Also, the present invention provides an information process system, an information process apparatus, a method of controlling the information process apparatus, and a storage medium that register an alternative process definition ticket based on common capabilities of devices so that an unexecutable function in a process definition ticket can be executed with the alternative process definition ticket.

Accordingly, in a first aspect of the present invention, there is provided an information process apparatus that creates a process definition ticket that defines a process comprising a plurality of processes, comprising a selecting unit adapted to select devices that have a potential for being used to execute the process based on the process definition ticket on a network, an obtaining unit adapted to obtain information on capabilities of the devices selected by the selecting unit, a designating unit adapted to designate process items included in a template, a display control unit adapted to display functions common or uncommon to the devices in an identifiable manner based on the information on the capabilities of the devices obtained by the obtaining unit in the process items designated by the designating unit, a template generating unit adapted to generate a process definition ticket template including common capabilities of the devices selected by the selecting unit with respect to the process items designated by the designating unit based on checking of the display provided by the display control unit, and a ticket creating unit adapted to create a process definition ticket that is to be carried out using the devices based on the template generated by the template generating unit.

Accordingly, in a second aspect of the present invention, there is provided an information process apparatus that creates a process definition ticket that defines a process comprising a plurality of processes, comprising a first ticket creating unit adapted to create a first process definition ticket that defines a process comprising a plurality of processes, a selecting unit adapted to select devices that have a potential for being used to execute the process based on the first process definition ticket on a network, an obtaining unit adapted to obtain information on capabilities of the devices selected by the selecting unit, a second process definition ticket creating unit adapted to create a second process definition ticket including common capabilities of the devices selected by the selecting unit based on the information on the capabilities of the devices obtained by the obtaining unit, and a registration unit adapted to resister the second process definition ticket as an alternative process definition ticket that replaces the first process definition ticket when there is a process that is unexecutable by capabilities of the devices during execution of the process based on the first process definition ticket.

Accordingly, in a third aspect of the present invention, there is provided an information process apparatus that controls processes of devices based on a process definition ticket, comprising an identifying unit adapted to identify a process definition ticket associated with devices, an obtaining unit adapted to obtain information on capabilities of the devices, a determination unit adapted to determine whether or not functions of the process definition ticket are executable by the devices based on the process definition ticket and the information on the capabilities of the devices obtained by the obtaining unit, and a switching unit adapted to validate an alternative process definition ticket according to an unexecutable functions when the determination unit determines that the functions of the process definition ticket are unexecutable by the devices.

According to the present invention, because process definition (creation of a process definition ticket) is carried out, the process definition ticket can be efficiently created and managed without carrying out operation check based on the process definition ticket.

Moreover, because a template is created based on information on the capabilities of devices that execute a process included in a process definition ticket, and a process definition ticket can be created based on the template, the process definition ticket can be easily created.

Further features of the present invention will become apparent from the following description of exemplary embodiments (with reference to the attached drawings).

BRIEF DESCRIPTION OF THE DRAWINGS

FIG. 6 is a flow chart useful in explaining a process definition ticket editing process carried out by an administrator-use PC according to a first embodiment of the present invention;

FIG. 7 is a diagram showing an exemplary display of a list of process definition ticket process items (setting items) and the capabilities of devices displayed on the administrator-use PC according to the first embodiment;

FIG. 8 is a diagram showing an exemplary display displayed on a UI display unit of the administrator-use PC according to the first embodiment;

FIG. 10 is a diagram showing an exemplary display displayed again in step S5 after selected devices are changed in step S6 in FIG. 6 in the contents displayed in FIG. 8;

FIG. 11 is a flow chart useful in explaining a process definition ticket editing process carried out by an administrator-use PC according to a second embodiment of the present invention;

FIG. 13 is a flow chart useful in explaining a process definition ticket switching process in steps S46 and S47 in FIG. 12 according to the third embodiment.

DESCRIPTION OF THE EMBODIMENTS

The present invention will now be described in detail with reference to the drawings showing preferred embodiments thereof.

Figure 1:
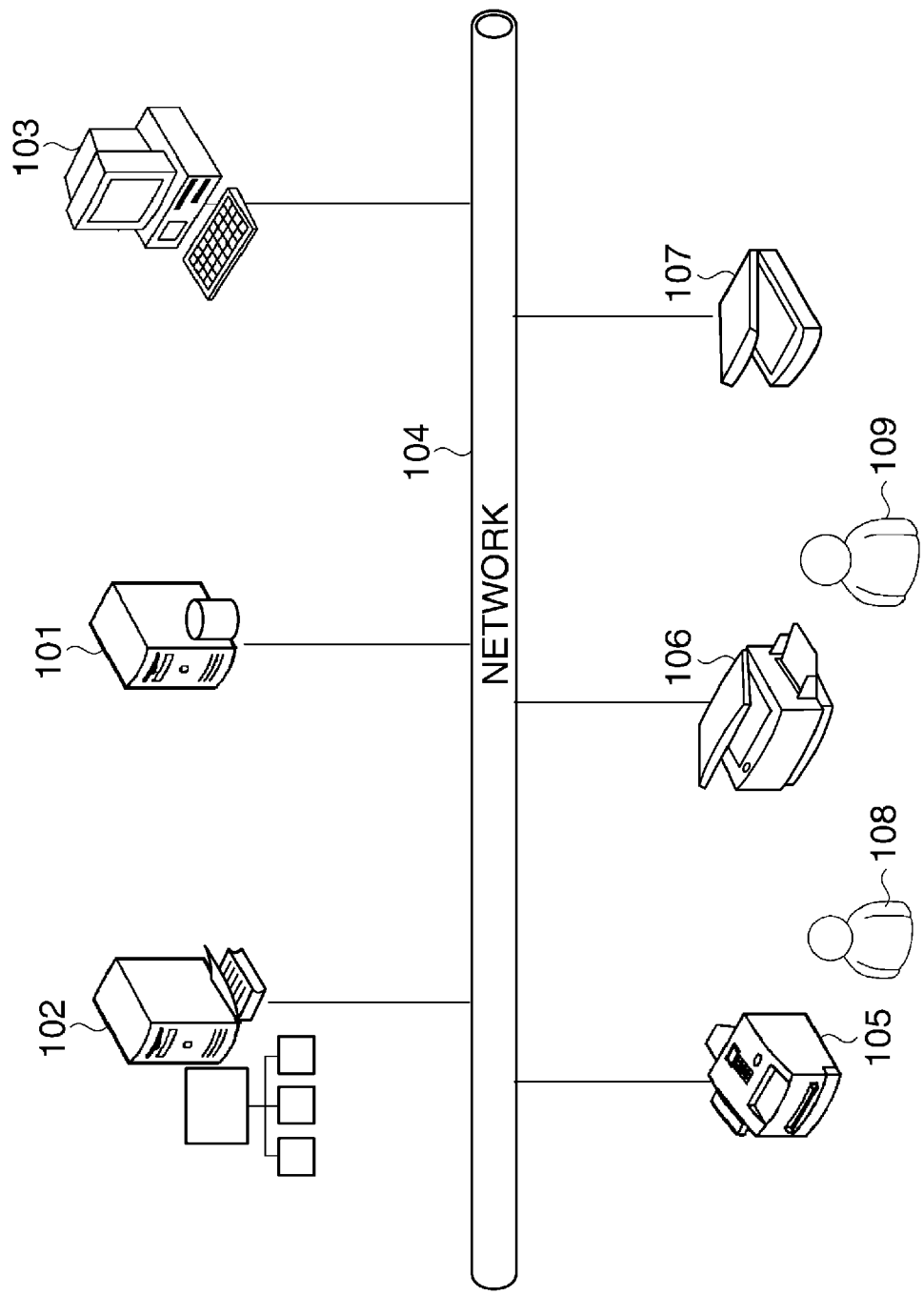
FIG. 1 is a view useful in schematically explaining an information process system according to an embodiment of the present invention.

FIG. 1 is a view useful in schematically explaining an arrangement of an information process system according to an embodiment of the present invention. In the following description, it is assumed that this system is an information process system in which processes to be executed by image process devices (MFP) and an information process apparatus (PC) are defined, and servers that manage the processes, the image process apparatus, and the information process apparatus are connected together via a network.

Devices 105, 106, and 107 have functions of reading originals and transmitting the read image data to various devices or terminals connected to a network 104. It should be noted that the devices 105, 106, and 107 may be single-function devices that can use only a scanner function on a network, or may be devices such as a multifunctional peripheral (MFP) that can provide a plurality of functions (scanning, printing, facsimile communication, and so on).

An administrator-use PC 103 is an apparatus that creates and edits files (referred to as process definition tickets in the present embodiment) in which contents of processes carried out by the devices 105, 106, and 107 and a ticket process server 101 are described. Examples of the contents of processes described in the process definition tickets include designation of the reading resolution, reading size, color reading, luminance adjustment, and so on at the time of reading of image data, and the contents of processes after reading of the image data (e-mail transmission, file transmission, an OCR process, and so on).

A ticket management server 102 stores and manages process definition tickets, which are created by the administrator-use PC 103, in association with user information. Also, the ticket management server 102 obtains process definition tickets from the devices 105, 106, and 107, which are to execute the contents of process described in the process definition tickets, as well as the ticket process server 101. The ticket management server 102 may be a device that can offer a directory service (for example, an active directory service) insofar as it can store process definition tickets and obtain process definition tickets.

The ticket process server 101 carries out postprocessing flows described in the process definition tickets on image data transmitted from the devices 105, 106, and 107. An example of the postprocessing flows referred to here is a process in which image data is transmitted as a file to another server in accordance with settings of a process definition ticket. Another example of the postprocessing flows is a process in which an E-mail is transmitted to another E-mail server in accordance with settings of a process definition ticket. A user 108 and a user 109 operate the devices 105 and 106, respectively.

In broad outline, a process flow using a process definition ticket is comprised of generating a process definition ticket in which a process flow and settings are described is created using the administrator-use PC 103, and the process definition ticket is stored in the ticket management server 102. Then, when the user 108 (109) is to use the device 105 (106), the process definition ticket stored in the ticket management server 102 is read into the device 105 (106), and an image is read in accordance with contents described in the process definition ticket. The image data thus read as well as the process definition ticket is transmitted to the ticket process server 101, and postprocessing as described earlier is executed by the ticket process server 101, which completes the process flow.

Figure 2:
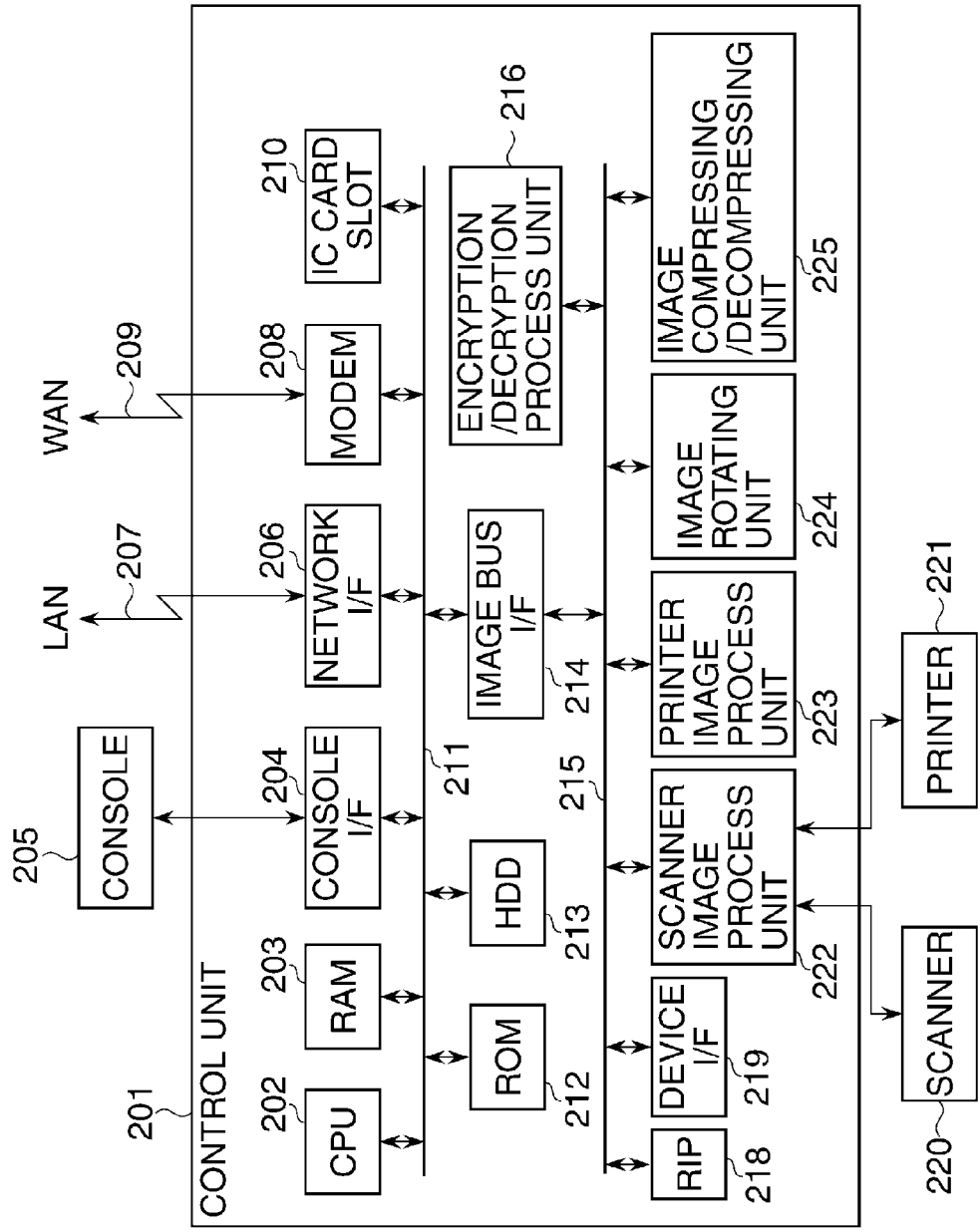
FIG. 2 is a block diagram schematically showing an arrangement of devices (information process devices) according to the embodiment.

FIG. 2 is a block diagram schematically showing an arrangement of the devices (image process apparatuses) 105, 106, and 107 according to the present embodiment. It should be noted that all the devices 105, 106, and 107 may have the arrangement shown in FIG. 2, or any of the devices 105, 106, and 107 may have another arrangement. For example, any of the devices 105, 106, and 107 may not have a printer.

A controller unit 201 controls the overall operation of the device, and is connected to a scanner 220, an image input unit, and a printer 221, an image output unit. The controller unit 201 is further connected to a LAN 207 and a public line (WAN) 209 to input and output image data and device information. A CPU 202 carries out various kinds of control, described later, by executing programs stored in a RAM 203 or a ROM 212 so as to control the overall operation of the device. The RAM 203 provides a work memory for temporarily storing various data when the CPU 202 carries out various kinds of control processes. The ROM 212 is a boot ROM and stores, for example, a boot program executed at the time of boot-up of the device. An HDD 213 is a hard disk drive and stores an OS and various application programs, and at the time of execution of programs, the programs are loaded into the RAM 203 and executed by the CPU 202. A console I/F 204 is an interface for connecting to a console (UI) 205 having a touch panel. The console I/F 204 outputs, to the console 205, image data to be displayed on the console 205, and transmits information inputted on the console 205 to the CPU 202. A network I/F 206 is connected to the LAN 207 and inputs and outputs communication data. A modem 208 is connected to the public line 209, and inputs and outputs communication data. An image bus interface (I/F) 214 acts as a bus bridge, which connects to each other a system bus 211 and an image bus 215 capable of transferring image data at high speed. The image bus 215 is comprised of a PCI bus, an IEEE 1394, or the like.

Next, a description will be given of units connected to the image bus 215.

A raster image processor (RIP) 218 expands a PDL (page-description language) code into a bitmap image. A device I/F unit 219 connects the scanner 220 and the printer 221 and the controller unit 201 together, and carries out synchronous-to-asynchronous conversion of image data. A scanner image process unit 222 corrects, processes, and edits image data inputted from the scanner 220. A printer image process unit 223 carries out correction, resolution conversion, etc. on image data, which is to be outputted to the printer 221, according to the performance of the printer 221. An image rotating unit 224 rotates image data. An image compressing/decompressing unit 225 carries out compression and decompression of multi-valued image data using JPEG, and compression and decompression of binary image data using JBIG, MMR, MH, or the like of binary format image. An IC card slot 210 inputs and outputs a key for encryption and decryption through input of an appropriate PIN (personal identification number) code after an IC card medium is inserted into the IC card slot 210. An encryption/decryption process unit 216 is a hardware accelerator board that carries out encryption and decryption process on data using a key in the IC card slot 210.

It should be noted that although in the exemplary arrangement shown in FIG. 2, the devices 105, 106, and 107 are multifunctional peripherals (MFP), the present invention is not limited to this. For example, the devices 105, 106, and 107 may be single-function devices that can use only a scanner function on a network. Namely, part of the arrangement shown in FIG. 2 may not exist depending on the arrangement of the devices 105, 106, and 107.

Figure 3:
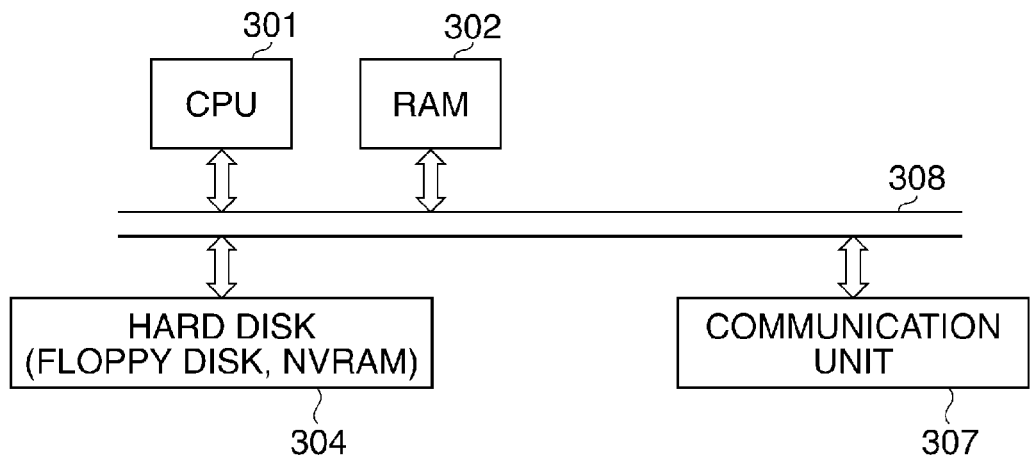
FIG. 3 is a block diagram schematically showing a hardware arrangement of a ticket management server according to the embodiment.

FIG. 3 is a block diagram schematically showing a hardware arrangement of the ticket management server 102 according to the present embodiment.

A CPU 301 controls an operation of the ticket management server 102 in accordance with a program loaded into a RAM 302. The CPU 301 uses the RAM 302 as a work area. A hard disk 304 (including a nonvolatile memory such as an NVRAM) stores various programs to be executed by the CPU 301 and various settings. A communication unit 307 carries out communication with other apparatuses and devices via the network 104. A main bus 308 connects the CPU 301 and various memories and the communication unit 307 together, and transmits data and various control signals. The ticket management server 102 may also have a UI display unit, a user command input unit, and so on, which are not shown. It should be noted that in the present embodiment, in the ticket management server 102, the CPU 301 controls the RAM 302, the hard disk 304, and the communication unit 307 via the main bus 308 to carry out operation, described later, unless otherwise specified.

Figure 4:
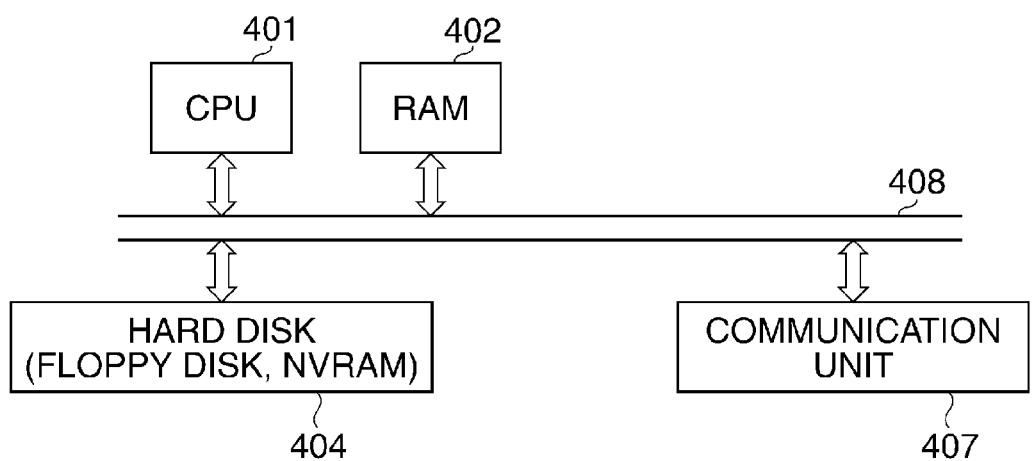
FIG. 4 is a block diagram schematically showing a hardware arrangement of a ticket process server according to the embodiment.

FIG. 4 is a block diagram schematically showing a hardware arrangement of the ticket process server 101 according to the present embodiment.

A CPU 401 controls an operation of the ticket process server 101 in accordance with a program loaded into a RAM 402. The CPU 401 uses the RAM 402 as a work area. A hard disk 404 (including a nonvolatile memory such as an NVRAM) stores various programs to be executed by the CPU 401 and various settings. A communication unit 407 carries out communication with other apparatuses and devices via the network 104. A main bus 408 connects the CPU 401 and various memories and the communication unit 407 together, and transmits data and various control signals. The ticket process server 101 may also have a UI display unit, a user command input unit, and so on, which are not shown. It should be noted that in the present embodiment, in the ticket process server 101, the CPU 401 controls the RAM 402, the hard disk 404, and the communication unit 407 via the main bus 408 to carry out operation, described later, unless otherwise specified.

Figure 5:
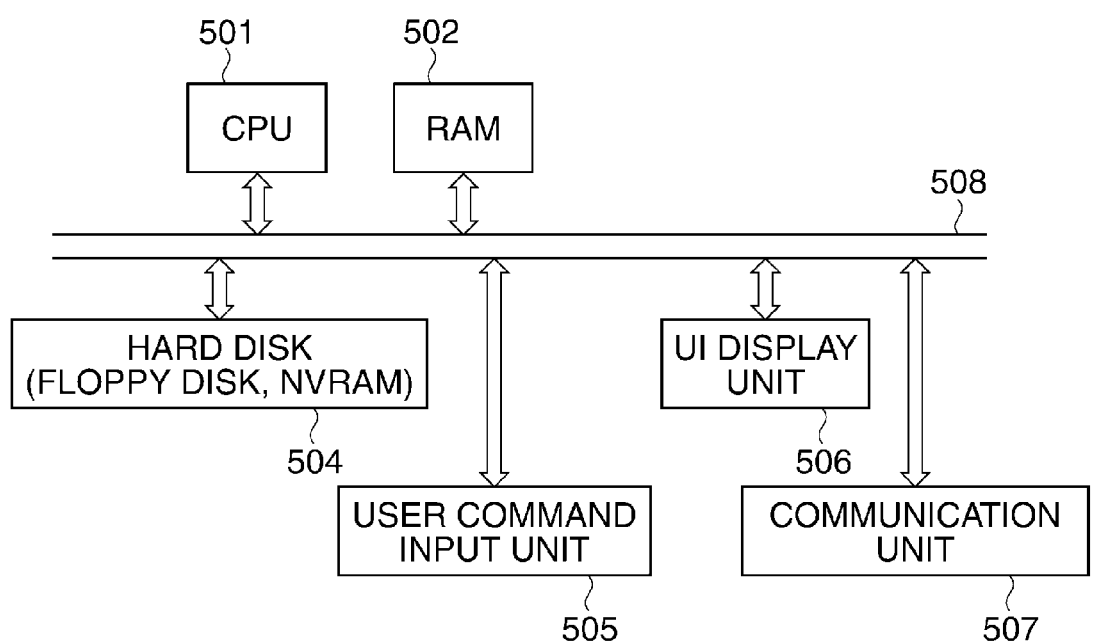
FIG. 5 is a block diagram schematically showing a hardware arrangement of an administrator-use PC according to the embodiment.

FIG. 5 is a block diagram schematically showing a hardware arrangement of the administrator-use PC 103 according to the present embodiment.

A CPU 501 controls an operation of the administrator-use PC 103 in accordance with a program loaded into a RAM 502. The CPU 501 uses the RAM 502 as a work area. A hard disk 504 (including a nonvolatile memory such as an NVRAM) stores various programs executed by the CPU 501 and various settings. A communication unit 507 carries out communication with other apparatuses and devices via the network 104. A user command input unit 505 is operated by a user to input various commands and data, and includes, for example, a keyboard, a pointing device, and a touch panel. A UI display unit 506 displays a UI screen for a user. The above described units are connected to the CPU 501 via a main bus 508. It should be noted that in the present embodiment, in the administrator-use PC 103, the CPU 501 controls the RAM 502, the hard disk 504, the user command input unit 505, the UI display unit 506, and the communication unit 507 via the main bus 508 to execute a process described later, unless otherwise specified.

Next, a description will be given a flow of a process according to a first embodiment with reference to a flow chart of FIG. 6.

FIG. 6 is a flow chart useful in explaining a process definition ticket editing process carried out by the administrator-use PC 103 according to the first embodiment of the present invention. It should be noted that a program for executing this process is installed in the hard disk 504, and at the time of execution, loaded into the RAM 502 and executed under the control of the CPU 501. It is assumed that at the start of this process, software for edition of a process definition ticket has been installed in advance in the administrator-use PC 103 shown in FIG. 5.

First, in step S1, a search is made for devices that are connected to the network 104 and can execute a process definition ticket. This search may be made in the same sub net, or under a combination of specific conditions such as a device name. Next, the process proceeds to step S2, where devices that have the potential for being used to execute the process definition ticket created from now on are selected from the devices found in the search in the step S1. In this selection, a plurality of devices may be selected at the same time. Next, the process proceeds to step S3, where information on the arrangement of a device required to generate the process definition ticket is obtained from at least one device selected in the step S2. Examples of the arrangement information include the types of image formats and reading resolutions supported by the device, whether or not color reading is possible, the presence or absence of a zoom function, and the presence or absence of an automatic document feeder (ADF). Next, the process proceeds to step S4, where when the number of devices obtained in the step S3 is plural, AND operation is performed on device component units based on the arrangement information on the devices. As a result, functions common to the devices can be extracted. It should be noted that when only one device is selected in the steps S2 and S3, the process in the step S4 is skipped. Also, when only one device is selected, functions of this device are used as common process items in a subsequent process. Next, the process proceeds to step S5, where a list that enables process items (setting items) extracted in the step S4 and changing items (changeable) that can be used as setting items in the process definition ticket at the time of generation thereof to be referred to is displayed on the UI display unit 506 of the administrator-use PC 103.

FIG. 7 is a diagram showing an example of the above-mentioned displayed list.

In the example shown in FIG. 7, the image format, the reading resolution, a reading size, and so on are displayed as changeable items. A reference numeral 712 designates setting items that set functions definable in a general process definition ticket.

Next, the process proceeds to step S6, where it is determined whether or not devices are to be reselected based on an instruction given by a user who edits the process definition ticket (a person who manages the process definition ticket). The reselection referred to here is, for example, to change the selection of the devices 105, the device 106, and the device 107 to the selection of only the device 105 and the device 106. Here, if the reselection is not to be carried out, the process proceeds to step S7, but if the reselection is to be carried out, the process returns to the step S2, where selection control is carried out so as to select devices again.

In the step S7, it is determined whether or not there are setting items common to a plurality of devices as a result of the AND operation in the step S4. When there are setting items that can be commonly used for a plurality of devices, a process definition ticket template in which only those common items are changeable is created (template generating process). Next, the process proceeds to step S9, where a process definition ticket is created and edited based on the template generated in the step S8. In the step S9, because the process definition ticket is edited based on the template, whether or not the process definition ticket is valid does not have to be determined on a device-to-device basis. Then, the process definition ticket editing process is terminated. After the completion of the process definition ticket editing process, the completed process definition ticket is stored in the ticket management server 102. Regarding the storage of the process definition ticket, the process definition ticket may be managed on a user-to-user basis.

On the other hand, when it is determined in the step S7 that there is no setting item that can be commonly used for the plurality of devices, the process proceeds to step S10, where the execution result is displayed on the UI display unit 506 of the administrator-use PC 103 without generating a process definition ticket template. Examples of the display include "No common process definition ticket setting item could not be found for the selected plurality of devices". Based on this notice, the present process may be terminated, and the edition of a process definition ticket is started again. However, because in the first embodiment, an object is to generate a process definition ticket, the process proceeds from the step S10 to step S11. In the step S11, the edition and creation of a new process definition ticket is carried out without using a process definition ticket template. Here, a process definition ticket is created not based on common setting items, and it is thus determined in step S12 whether or not the process definition ticket is valid (validation).

In an example of this validating process, the process definition ticket created in the step S11 is transmitted from the administrator-use PC 103 to the device that is to actually execute the process definition ticket. In response to this, the device determines whether or not each of the setting items described in the process definition ticket is valid. When all the setting items are valid, the device sends a signal "validation OK" to the administrator-use PC 103. On the other hand, when all the setting items are not valid, the device sends a signal "validation NG" to the administrator-use PC 103. In this case, the device may add concrete information indicative of which setting items are invalid. When it is determined in the step S12 that the process definition ticket is valid, the present editing process is terminated, but when the validation result is NG, the process returns to the step S11, where the process definition ticket is reedited, and the process is repeated until the validation result is OK.

When the edition of the process definition ticket is completed, the completed process definition ticket is stored in the ticket management server 102. Regarding the storage of the process definition ticket, the process definition ticket may be managed on a user-to-user basis.

Next, a description will be given of FIGS. 7 to 9. These figures show examples of contents displayed on the UI display unit 506 of the administrator-use PC 103 in the process in the step S5 in FIG. 6.

FIG. 7 is a diagram showing an exemplary display displayed on the administrator-use PC 103 according to the first embodiment. Here, a list displayed first in the step S5 in FIG. 6 is shown.

As the setting items 712, items that can be set in a process definition ticket on the administrator-use PC 103 are listed. A reference numeral 713 designates filter conditions, which are items for narrowing down items for creating a template. The details thereof will be described later with reference to FIG. 8. Reference numerals 714, 715, and 716 designate a list of information on the arrangements of the devices obtained in the step S3 in FIG. 6. A reference numeral 701 designates a list of information on image formats supported by the devices when a scanned image is handled as a data file. A reference numeral 702 designates a list of information indicative of whether or not the devices can automatically detect the size of an original to be scanned. A reference numeral 703 designates a list of information on reading resolutions that can be designated in reading an original by a scanner. Here, reading resolutions in the X-direction and the Y-direction are listed. A reference numeral 704 designates a list of information on color reading. Even in the case of color reading, different values are set according to the capabilities of the devices like RGB24 (reading with a 24-bit gradation) and RGB16 (reading with a 16-bit gradation), although this is not described in the first embodiment. A reference numeral 705 designates information indicative of whether a zoom function can be used in reading an original. A reference numeral 706 designates a list of information on the reading size of an original to be scanned. Here as well, information on the maximum reading size and the minimum reading size in the X-direction and the Y-direction is listed, respectively. A reference numeral 707 designates a list of information indicative of whether or not double-sided reading can be automatically performed in the case that an original including contents printed on both sides thereof. A reference numeral 708 designates a list of information indicative of whether or not there is a compressing function for scanned image data. In the case of a device having a plurality of compressing methods, a plurality of image compressing methods that can be designated are listed although this is not described in the first embodiment. A reference numeral 709 designates a list of information indicative of whether or not an automatic document feeder (ADF) for supplying originals to the scanner 220 is installed. A reference numeral 710 designates a list of information indicative of whether or not reading with contrast adjustment instructed is possible at the time of scanning of an original. A reference numeral 711 designates a list of information indicative of whether or not reading with luminance adjustment instructed is possible at the time of scanning of an original.

FIG. 8 is a diagram showing an exemplary display displayed on the UI display unit 506 of the administrator-use PC 103 according to the first embodiment. In this example, a user places checkmarks in setting items required to create a process definition ticket template among the filter items 713 in the step S5 in FIG. 6. Here, checkmarks are placed in rows designated by reference numerals 801 to 806. After the checkmarks are placed, the UI display screen is updated at a time point at which the display on the UI display screen is updated or checked, although this is not shown.

In the example shown in FIG. 8, all the selected devices can execute functions relating to setting items of the process definition ticket designated by the reference numerals 801, 802, and 803. However, the functions of all the devices do not match with respect to the setting items of the process definition ticket designated by the reference numerals 804, 805, and 806. Specifically, in 804, the device 107 does not match with respect to color reading. Also, in 805, the devices 105 and 107 do not match with respect to double-sided reading. Further, in 806, the device 106 does not match with respect to the presence or absence of an ADF.

Figure 9:
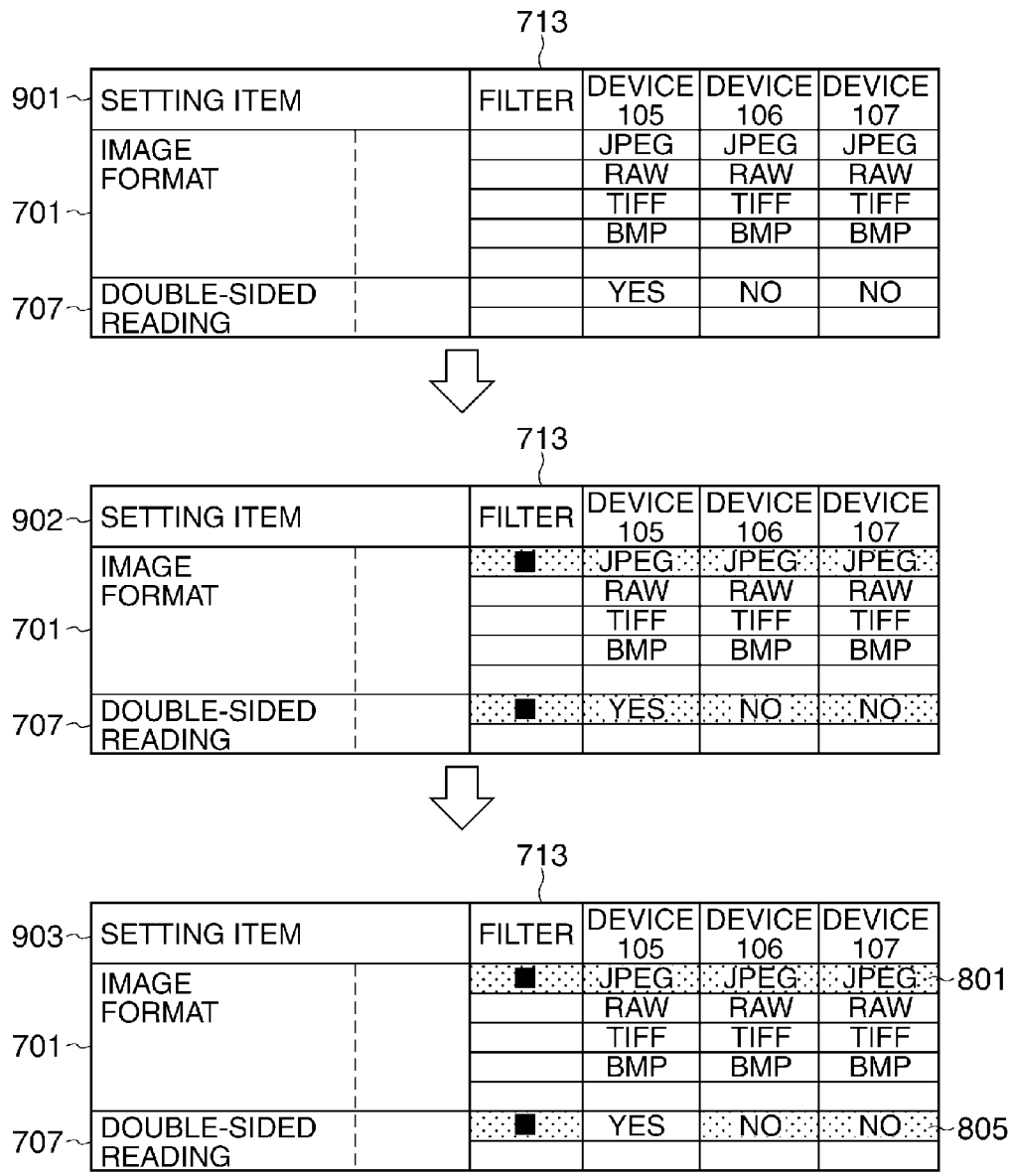
FIG. 9 is a diagram useful in explaining an example of how displays are changed on the UI display unit of the administrator-use PC according to the first embodiment.

FIG. 9 is a diagram useful in explaining an example of how displays are changed on the UI display unit 506 of the administrator-use PC 103 according to the first embodiment. Here, there is shown an example based on the displays shown in FIGS. 7 and 8 described above.

A reference numeral 901 designates an exemplary display of a part of the display items in FIG. 7 extracted for explanation. The display at this point is the same as the display shown in FIG. 7. A reference numeral 902 designates a display at a time point at which the user places checkmarks in the filter items 713. This example shows a state in which checkmarks are placed in a detailed item "JPEG" of the image format items 701 and the double-sided reading items 707. A reference numeral 903 designates an exemplary display (corresponding to FIG. 8) in the case that after the checkmarks are placed in the items in the filter items 713, an instruction for updating the UI screen is given although this is not shown. In 801, it is indicated in an identifiable manner (indicated in blue, for example) that the image format is supported by all the selected devices. Also, in 805, it is indicated in an identifiable manner (indicated in red, for example) that the device 106 and the device 107 are not applicable to the double-sided reading.

FIG. 10 is a diagram showing an exemplary display displayed again in the step S5 after the selected devices are changed in the step S6 in FIG. 6 on the display in FIG. 8. Here, the selection of the devices 105, 106, and 107 in FIG. 8 is changed to the selection of only the devices 105 and 106. Namely, the user who creates and edits the process definition ticket using the administrator-use PC 103 excludes the device 107 from devices intended for executing the process definition ticket according to the display in FIG. 8. This excluding process is carried out by selectively determined to reset devices in the step S6 in FIG. 6, returning to the step S2, and selecting the devices 105 and 106 as devices that are to execute the process definition ticket. After that, the steps S3 and S4 are executed, and then, as described earlier with reference to FIG. 8, filter items are set again as shown in FIG. 10.

In the example shown in FIG. 10, filter items are designated by reference numerals 1001 to 1004. As a result, a process definition ticket template as described below is generated, which includes setting items common to the device 105 and the device 106.

The reference numeral 1001 indicates that the image format is JPEG, the reference numeral 1002 indicates that the reading resolution in the X-direction is 600 dpi, and the reference numeral 1003 indicates that the reading resolution in the Y-direction is 600 dpi. The reference numeral 1004 indicates that color reading is RGB24. The process definition ticket template that satisfies these conditions is generated in the step S8 in FIG. 6.

As described above with reference to FIGS. 7 to 10, because the filter items 713 is used, it is possible to easily determine which device does not satisfy conditions, that is, which device should be to excluded so as to create a desired process definition ticket template.

On the other hand, in a little simpler way, a process definition ticket template may be automatically generated by focusing attention on only the number of setting items that can be validated like the number of selectable setting items in setting items of a process definition ticket among information on the arrangements of the devices selected in the step S3. For example, in the example in FIG. 8, three items can be executed using a combination of the three devices 105, 106, and 107 among six items corresponding to the filter selected by the user. Similarly, four items can be executed using a combination of the two devices 105 and 106. Similarly, three items can be executed using a combination of the two devices 106 and 107. As is clear from the results, the combination of the devices 105 and 106 and the combination of the devices 106 and 107 can execute a larger number of items than other combinations. Thus, a template based on the combination of the devices 105 and 106 that can generate a large number of items and a template based on the combination of the devices 106 and 107 that can generate a large number of items are automatically generated.

As described above, according to the first embodiment, a process definition (process definition ticket) template is created, and a process definition ticket can be created based on the template. This obtains the effect that a process definition (process definition ticket) template can be created without carrying out troublesome process such as checking, verification, and redefinition of the process definition ticket.

Moreover, a process definition (process definition ticket) template based on information on the capabilities of devices that execute part of a process is created, and a process definition ticket can be created according to the template. Thus, a process definition ticket can be easily created without grasping the details of information on the capabilities of devices on a network.

Next, a description will be given of a second embodiment of the present invention. It should be noted that the arrangements of the system, the servers 101 and 102, the PC 103, and other devices according to the second embodiment are the same as those according to the first embodiment, and therefore description thereof is omitted.

FIG. 11 is a flow chart useful in explaining a process definition ticket editing process carried out by the administrator-use PC 103 according to the second embodiment of the present invention. It should be noted that a program for executing this process is installed in the hard disk 504, and is loaded into the RAM 502 and executed under the control of the CPU 501 at the time of execution. It is assumed that at the start of this process, software for edition of a process definition ticket has been installed in advance in the administrator-use PC 103 shown in FIG. 5. The second embodiment differs from the first embodiment in that a process definition ticket A is created using only common items in step S26 (in the first embodiment, a template is created). Also, the second embodiment differs from the first embodiment in that validation is carried out on a process definition ticket B according to the result of a determination as to the presence or absence of an alternative process definition ticket A in step S29, and an alternative process definition ticket is registered at the same time in step S30.

Upon the start of the edition of a process definition ticket, first in step S21, a search is made for devices that are connected to the network 104 and can execute the process definition ticket. This search may be made in the same sub net, or under a combination of specific conditions such as a device name. Next, the process proceeds to step S22, where devices that have the potential for being used to execute the process definition ticket created from now on are selected from the devices found in the search in the step S21. In this selection, a plurality of devices may be selected at the same time. Next, the process proceeds to step S23, where information on the arrangements of the devices required to generate the process definition ticket are obtained from the devices selected in the step S22. Examples of the arrangement information include the types of image formats and reading resolutions supported by the device, whether or not color reading is possible, the presence or absence of a zoom function, and the presence or absence of an automatic document feeder (ADF). Next, the process proceeds to step S24, where AND operation is performed on device component units so as to find common items in the arrangement information of the plurality of devices obtained in the step S23. Then, in step S25, it is determined whether or not there are setting items that can be commonly used for the plurality of devices. As a result of the determination, when there are common items, the process proceeds to the step S26, where a process definition ticket A comprised of only the common items is created.

On the other hand, as a result of the determination in the step S25, when there are no setting items that can be commonly used for the plurality of devices, the process proceeds to step S28. In the step S28, the execution result is displayed on the UI display unit 506 of the administrator-use PC 103 without creating any process definition ticket corresponding to the process definition ticket A as in the step S26. Examples of this display include "No process definition ticket common to the selected plurality of devices could be automatically created".

After the step S26 or the step S28 is thus executed, the process proceeds to step S27, where a ticket creating process which has nothing to do with the device arrangement information is carried out. Specifically, a new first process definition ticket (a process definition ticket B in the second embodiment) is edited and created on the administrator-use PC 103. After the process definition ticket B is thus created, the process proceeds to step S29, where it is determined whether or not there is the process definition ticket A (the second process definition ticket) created in the step S26. As a result of the determination, when there is the process definition ticket A, the process proceeds to step S30, and when there is not the process definition ticket A, the process proceeds to step S31. In the step S-30, the process definition ticket A is associated with the process definition ticket B as an alternative process definition ticket to the process definition ticket B, and these tickets are registered in the ticket management server 102, followed by terminating the process.

As a result, at the time of execution of the process definition ticket B, when it is determined that there is any function in the process definition ticket B which is unexecutable by the functions of the selected devices, the process definition ticket B is replaced so that the process definition ticket A can be used. Thus, even in the case that a newly created process definition ticket cannot be executed, it can be replaced with a process definition ticket based on common functions of a plurality of devices, and hence the situation that the process stops without executing the process definition ticket can be avoided.

On the other hand, in the step S31, because there is only the process definition ticket B, validation is carried out so as to determine whether or not the process definition ticket B is valid. In an example of this validating process, a file of the process definition ticket B is transmitted from the administrator-use PC 103 to a device that is to execute the process definition ticket B. As a result, the device determines whether setting items written in the process definition ticket B are valid on an item-to-item basis. Then, upon determining that all the setting items written in the process definition ticket B are valid, the device sends back a validate OK to the administrator-use PC 103. On the other hand, when any one of the setting items written in the process definition ticket B is invalid, the device sends back a validate NG to the administrator-use PC 103. In this instance, the device may add information indicative of which setting item is invalid to the reply. Thus, as a result of the validation in the step S31, when the determination result is OK, the process definition ticket B is registered in the ticket management server 102, which completes the edition of the process definition ticket. It should be noted that when the validation result in the step S31 is NG, the process returns to the step S27, where the process definition ticket B is reedited, and the process is repeated until the validation result is OK.

As described above, according to the second embodiment, a process definition (process definition ticket) is created based on functions that can be commonly executed by a plurality of devices, and this process definition ticket can be registered as an alternative process definition ticket to a new job definition ticket. This obtains the effect that even when there is any unexecutable function in the new process definition ticket, the function can be executed using the alternative process definition ticket on behalf of the new process definition ticket.

Next, a description will be given of a third embodiment of the present invention. The third embodiment differs from the first and second embodiments in that the present state of a device that is to actually execute a process definition ticket is obtained and it is determined whether or not the process definition ticket is executable in the obtained state of the device and then according to the determination result, an alternative process definition ticket is validated. It should be noted that the arrangements of the system, the servers 101 and 102, the PC 103, and the devices according to the third embodiment are the same as those according to the above described first embodiment, and therefore description thereof is omitted.

Figure 12:
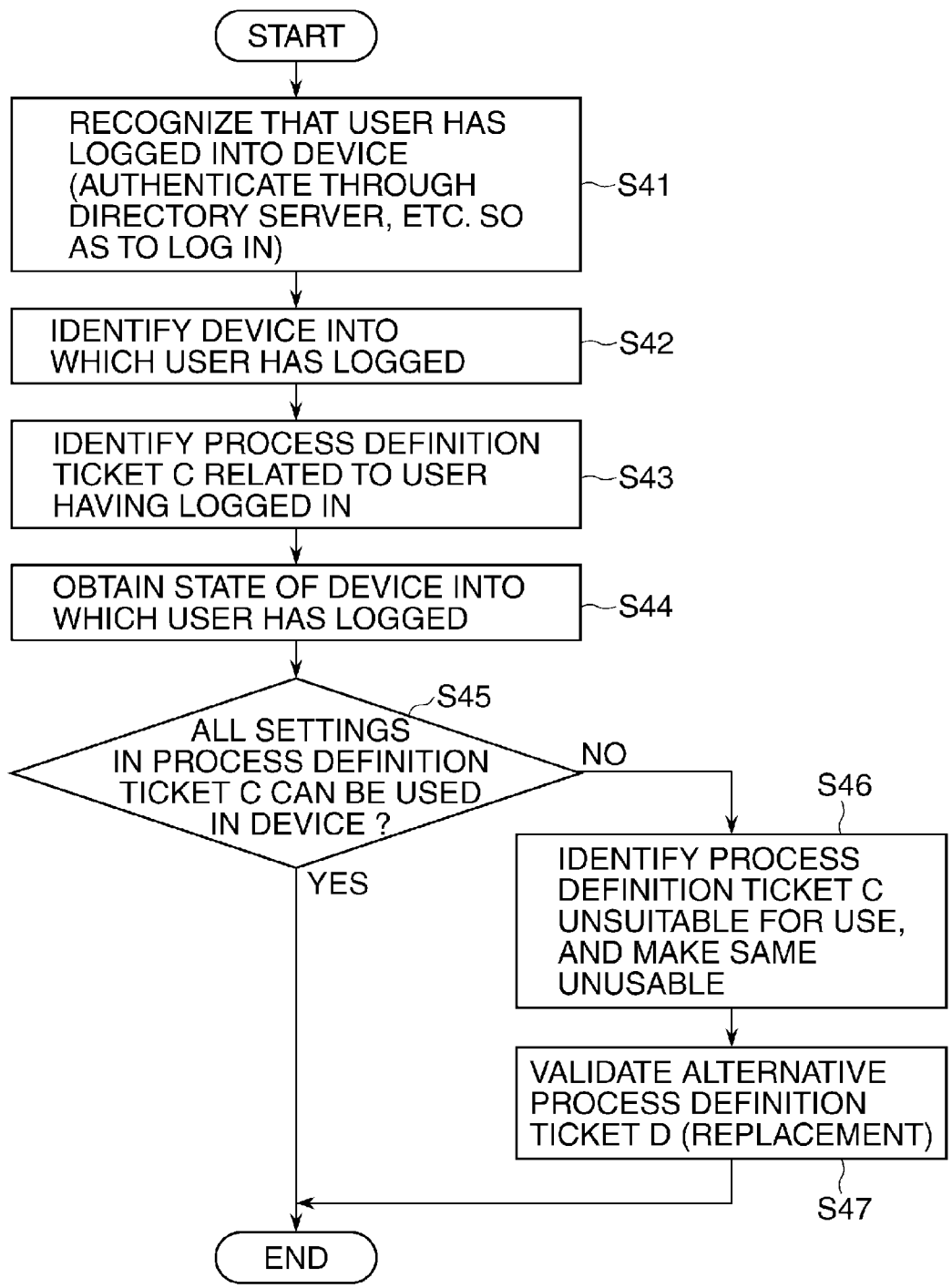
FIG. 12 is a flow chart useful in explaining a device monitoring process carried out by a ticket management server according to a third embodiment of the present invention.

FIG. 12 is a flow chart useful in explaining a device monitoring process carried out by the ticket management server 102 according to the third embodiment. It should be noted that a program for executing this process is installed in the hard disk 304, and is loaded into the RAM 302 and executed under the control of the CPU 301 at the time of execution. It is assumed that at the start of this process, software for device monitoring has been installed in advance in the ticket management server 102 shown in FIG. 3.

The device monitoring process is started by monitoring a device having a process definition ticket, and first in step S41, the user 108 or 109 who uses the device logs into the device using the console 205. Alternatively, it is recognized that the user 108 or 109 carries out a login operation such as insertion of an IC card medium into the IC card slot 210 and is authenticated through a directory service (for example, an active directory). Then, the process proceeds to step S42, where the device into which the user has logged is identified. It is assumed here that the device 105 is identified as the device into which the user has logged. The device identification is carried out by obtaining information that uniquely identifies a plurality of devices connected to the network 104 such as information on an IP address, name, and serial number of a device into which a user has logged. Then, the process proceeds to step S43, where a process definition ticket C associated with the user 108 who has logged into the device 105 is identified. It is assumed that the association of user information and a process definition ticket with each other is carried out when the process definition ticket created by the administrator-use PC 103 is put in the ticket management server 102. Then, the process proceeds to step S44, where the present state of the device 105 into which the user 108 has logged is obtained.

Then, the process proceeds to step S45, where the present state of the device 105 obtained in the step S44 and the settings of the process definition ticket C associated with the user 108 in the step S43 are compared with each other. Then, it is determined whether or not all the setting items set in the process definition ticket C can be executed in the present state of the device 105. For example, even if the use of an ADF is set in the process definition ticket C, the ADF cannot be used due to a trouble in hardware or the like although scanning without using the ADF is possible. As a result of the determination in the step S45, when all the setting items set in the process definition ticket C can be executed in the present state of the device 105, the process is carried out so that the device 105 can operate according to the settings of the process definition ticket C, followed by terminating the process.

On the other hand, as a result of the determination in the step S45, when all the setting items set in the process definition ticket C cannot be executed in the present state of the device 105, the process proceeds to step S46, where the process definition ticket C is made unexecutable. The setting to make the process definition ticket C unexecutable is made in the ticket management server 102 according to an instruction from monitoring software. Then, the process proceeds to step S47, where an alternative process definition ticket D prepared in advance is validated. The setting to validate the process definition ticket D is made in the ticket management server 102 according to an instruction from the monitoring software. In the third embodiment, the process definition ticket D is a process definition ticket executed without using an ADF. Then, the process is carried out so that the device 105 can operate according to the settings in the process definition ticket D, followed by terminating the process.

FIG. 13 is a diagram useful in explaining a process definition ticket switching process in the steps S46 and S47 in FIG. 12 according to the third embodiment.

A reference numeral 1301 designates a list of process definition tickets in the case that no alternative process definition ticket is applied. A reference numeral 1310 designates a row in which process definition tickets to be actually distributed to devices are listed, and the ticket management server 102 is to distribute the process definition tickets listed in the row 1310. A reference 1313 designates a process definition ticket C according to the third embodiment, and A reference numeral 1314 designates a process definition ticket V as another example. A reference numeral 1311 designates a list of alternative process definition tickets for process definition tickets to be distributed. A reference numeral 1312 designates explanations of alternative process definition tickets. The process definition tickets 1301 may be displayed on the UI display unit of the ticket management server 102 if necessary, although this is not shown. A reference numeral 1315 designates the process definition ticket D that is registered so as to be used as an alternative to the process definition ticket C 1313 when it is determined that the ADF is unusable, and an explanation of the process definition ticket D. A reference numeral 1316 designates a process definition ticket E that is registered so as to be used as an alternative to the process definition ticket C 1313 when it is determined that color scanning is unusable, and an explanation of the process definition ticket E. A reference numeral 1317 designates a process definition ticket F that is registered so as to be used as an alternative to the process definition ticket C 1313 when it is determined that a function of detecting the size of an original is unusable, and an explanation of the process definition ticket F.

Similarly, a reference numeral 1318 designates a process definition ticket W that is registered so as to be used as an alternative to the process definition ticket V 1314 when it is determined that the ADF is unusable, and an explanation of the process definition ticket W. The reference numeral 1318 designates a process definition ticket X that is registered so as to be used as an alternative to the process definition ticket V 1314 when it is determined that color scanning is unusable, and an explanation of the process definition ticket X. A reference numeral 1320 designates a process definition ticket Y that is registered so as to be used as an alternative to the process definition ticket V 1314 when it is determined that reading of a double-sided original is unusable, and an explanation of the process definition ticket Y.

A reference numeral 1302 designates an exemplary arrangement after the process in the steps S46 and S47 in FIG. 12 is executed, in which a change described hereafter is made to the list 1301.

As a result of the process in the step S46, the process definition ticket C is excluded from process definition tickets to be distributed, and as indicated by a reference numeral 1322, the process definition ticket C is handled as a part of alternative process definition tickets, or as an unusable process definition ticket although this is not shown. In the display example 1302, the process definition ticket C is displayed as part of alternative process definition tickets, and is described as "Process Definition Ticket On Which Process Definition Ticket D/Process Definition Ticket E/Process Definition Ticket F are based". Moreover, it is indicated that replacement is carried out by the process according to the third embodiment. Moreover, as indicated by the reference numeral 1322, a display color may be changed on the UI display unit or the like of the ticket management server 102 so as to clarify that replacement has been done. A reference numeral 1321 indicates that the process definition ticket D is a process definition ticket to be distributed in place of the process definition ticket C.

It should be noted that when there are a plurality of alternative process definition tickets relating to a certain function, priority information for use in determining which one of the alternative process definition tickets is to be used is set in advance, and a process definition ticket to be used may be determined in order of priority according to the priority information.

As described above, according to the third embodiment, alternative process definition tickets are defined and registered for process definition tickets to be distributed according to functions thereof. Thus, even when a certain function of the process definition ticket to be distributed cannot be executed, the function can be achieved with an alternative process definition ticket.

Up to this point, the embodiments of the present invention have been described. Beside these, even in the case that an original process definition ticket to be distributed includes a function that cannot be executed by a certain device, the administrator-use PC 103 may automatically exclude this function to create a process definition ticket and distribute the same to the device.

Moreover, the administrator-use PC 103 may automatically discard process definition tickets that have become unnecessary among process definition tickets registered in the ticket management server 102.

Moreover, in the case that a plurality of process definition tickets are generated based on one template, the generated plurality of process definition tickets may be registered with priorities given thereto. Then, in the case that a certain process definition ticket is unexecutable, another process definition ticket may be selected as an alternative according to the priorities. Alternatively, a screen for selecting a process definition ticket may be displayed on, for example, a UI screen of a device so that a user can select a process definition ticket.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-282437 filed Oct. 31, 2008, which is hereby incorporated by reference herein in its entirety.

What is claimed is:

1. An information process apparatus that creates a process definition ticket that defines a process comprising a plurality of processes, comprising:
    a selecting unit adapted to select a plurality of devices;
    an obtaining unit adapted to obtain information on capabilities of the devices selected by said selecting unit;
    a display control unit adapted to display, when the selected devices have a common function with respect to a first setting item, the first setting item in a first display mode, and display, when the selected devices do not have a common function with respect to the first setting item, the first setting item in a second display mode that is different from the first display mode, based on the information on the capabilities of the devices obtained by said obtaining unit;
    a template generating unit adapted to generate a process definition ticket template including common functions between the devices based on checking of the display provided by said display control unit;
    a ticket creating unit adapted to create a process definition ticket that is to be carried out using the devices based on the process definition ticket template generated by said template generating unit; and
    a selection control unit adapted to, when no common function between the devices selected by said selecting unit is found, cause said selecting unit to select devices again.

2. An information process apparatus according to claim 1, further comprising a notification unit adapted to, when no common function between the devices selected by said selecting unit are found, notify a user accordingly.

3. An information process system that connects a plurality of devices and an information process apparatus together via a network, comprising:
    a selecting unit adapted to select devices that have a potential for being used to execute a process based on a process definition ticket on a network;
    an obtaining unit adapted to obtain information on capabilities of the devices selected by said selecting unit;
    a display control unit adapted to display common functions between the devices with a first common visual characteristic, and to display uncommon functions between the devices with a second common visual characteristic different than the first common visual characteristic, based on the information on the capabilities of the devices obtained by said obtaining unit;
    a template generating unit adapted to generate a process definition ticket template including common functions between the devices based on checking of the display provided by said display control unit;
    a ticket creating unit adapted to create a process definition ticket that is to be executed using the devices based on the process definition ticket template generated by said template generating unit;
    a registration unit adapted to register the process definition ticket created by said creating unit; and
    a selection control unit adapted to, when no common function between the devices selected by said selecting unit is found, cause said selecting unit to select devices again.

4. A control method for an information process apparatus that creates a process definition ticket that defines a process comprising a plurality of processes, comprising:

a selecting step of selecting a plurality of devices;

an obtaining step of obtaining information on capabilities of the devices selected in said selecting step;

a display control step of displaying, when the selected devices have a common function with respect to a first setting item, the first setting item in a first display mode, and displaying, when the selected devices do not have a common function with respect to the first setting item, the first setting item in a second display mode that is different from the first display mode, based on the information on the capabilities of the devices obtained in said obtaining step;

a template generating step of generating a process definition ticket template including common functions between the devices based on checking of the display provided in said display control step;

a ticket creating step of creating a process definition ticket that is to be executed using the devices based on the process definition ticket template generated in said template generating step; and a selection control step of, when no common function between the devices selected in said selecting step is found, causing another selection of devices.

5. A non-transitory computer-readable storage medium storing a computer-executable program comprising:

instructions for a selecting step of selecting a plurality of devices;

instructions for an obtaining step of obtaining information on capabilities of the devices selected in said selecting step;

instructions for a display control step of displaying, when the selected devices have a common function with respect to a first setting item, the first setting item in a first display mode, and displaying, when the selected devices do not have a common function with respect to the first setting item, the first setting item in a second display mode that is different from the first display mode, based on the information on the capabilities of the devices obtained in said obtaining step;

instructions for a template generating step of generating a process definition ticket template including common functions between the devices based on checking of the display provided in said display control step;

instructions for a ticket creating step of creating a process definition ticket that is to be executed using the devices based on the process definition ticket template generated in said template generating step; and instructions for a selection control step of, when no common function between the devices selected in said selecting step is found, causing another selection of devices.

6. An information process apparatus according to claim 1, wherein said ticket creating unit is adapted to create the process definition ticket that defines the process related to at least one of the common functions selected by a user, based on the template generated by said template generating unit.

7. An information process apparatus according to claim 1, further comprising a registering unit adapted to register the process definition ticket created by said ticket creating unit, as an alternative process definition ticket, when each of the plurality of devices is capable of executing the process based on a predetermined process defining ticket.

8. An information process apparatus according to claim 1, wherein the process definition ticket created by said ticket creating unit defines the process related to at least a scan function.

* * * * *